(12) United States Patent
Mollhagen

(10) Patent No.: US 7,669,865 B2
(45) Date of Patent: Mar. 2, 2010

(54) AXLE SUSPENSION FOR HEAVY VEHICLES

(75) Inventor: Klaus-Peter Mollhagen, Memmingen (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 131 days.

(21) Appl. No.: 12/070,209

(22) Filed: Feb. 15, 2008

(65) Prior Publication Data

US 2008/0246241 A1 Oct. 9, 2008

(30) Foreign Application Priority Data

Feb. 16, 2007 (DE) .................... 20 2007 002 349 U
Mar. 21, 2007 (DE) .................... 20 2007 004 178 U

(51) Int. Cl.
*B60G 9/02* (2006.01)

(52) U.S. Cl. ..................... 280/124.112; 280/124.116

(58) Field of Classification Search .......... 280/124.111, 280/124.112, 124.116, 124.128, 124.13, 280/124.11, 124.106

See application file for complete search history.

(56) References Cited

U.S. PATENT DOCUMENTS

| | | | |
|---|---|---|---|
| 2,576,824 A | | 11/1951 | Lee |
| 3,773,348 A | * | 11/1973 | Davis ................ 280/124.114 |
| 3,807,752 A | | 4/1974 | Mauck |
| 4,053,170 A | * | 10/1977 | Hyler et al. .............. 280/6.154 |
| 4,053,171 A | | 10/1977 | Hyler |
| 4,248,447 A | | 2/1981 | Hart |
| 5,476,285 A | | 12/1995 | Dickerson |
| 5,971,413 A | * | 10/1999 | El-Kassouf ........... 280/124.111 |
| 6,056,304 A | * | 5/2000 | Brambilla ............ 280/124.111 |
| 6,086,076 A | * | 7/2000 | Prem et al. ............ 280/124.111 |
| 6,279,931 B1 | * | 8/2001 | Kopczynski ......... 280/124.111 |
| 6,322,090 B1 | * | 11/2001 | Chignoli et al. ....... 280/124.157 |
| 6,942,232 B1 | * | 9/2005 | McGhie ............... 280/124.112 |
| 7,204,499 B2 | * | 4/2007 | Miyake et al. ........ 280/124.111 |
| 7,213,824 B1 | * | 5/2007 | McGhie ............... 280/124.112 |

(Continued)

FOREIGN PATENT DOCUMENTS

EP 1359032 11/2003

(Continued)

*Primary Examiner*—Paul N Dickson
*Assistant Examiner*—Jordan Golomb
(74) *Attorney, Agent, or Firm*—Dilworth & Barrese LLP

(57) ABSTRACT

The present invention relates to an axle suspension for heavy vehicles, in particular trucks, comprising an axle beam which bears axle parts projecting over at oppositely disposed sides, each axle part preferably bearing a wheel drive; an axle beam bearing which permits upward and downward movements of the axle beam as well as pendular movements of the axle beam around a substantially lying pendular axis transverse to the longitudinal direction of the axle parts; a spring device for the resilient support of the upward and downward movements of the axle beam at a vehicle frame; and also a pendular damping device for the damping of the pendular movements of the axle beam. The invention is characterized in that the pendular damping device has a rotary axle which is pivoted to a part connected to the vehicle frame and drives a damping lever rotatably pivoted to the axle beam in a rotary manner on pendular movements of the axle beam, said damping lever acting on at least one damping element fastened to the axle beam.

23 Claims, 3 Drawing Sheets

U.S. PATENT DOCUMENTS

| | | | |
|---|---|---|---|
| 7,562,887 B1 * | 7/2009 | Sutton et al. | 280/124.112 |
| 2002/0070521 A1 * | 6/2002 | Panizzolo et al. | 280/124.111 |
| 2002/0101052 A1 * | 8/2002 | Panizzolo | 280/124.111 |
| 2007/0176385 A1 * | 8/2007 | Barton et al. | 280/124.116 |

FOREIGN PATENT DOCUMENTS

| | | |
|---|---|---|
| GB | 818992 | 8/1959 |
| GB | 933537 | 8/1963 |
| WO | 96/30223 | 10/1996 |

* cited by examiner

AXLE SUSPENSION FOR HEAVY VEHICLES

BACKGROUND OF THE INVENTION

The present invention relates to an axle suspension for heavy vehicles, in particular trucks such as large dump trucks, comprising an axle beam which bears axle parts projecting over at oppositely disposed sides, each axle part preferably having a wheel drive; an axle beam bearing which permits upward and downward movements of the axle beam as well as pendular movements of the axle beam around a substantially lying pendular axis transverse to the longitudinal direction of the axle parts; a spring device for the resilient support of the upward and downward movements of the axle beam at a vehicle frame; and also a pendular damping device for the damping of the pendular movements of the axle beam.

With a specific truck construction, the rear axle is formed from two axle parts which are arranged approximately parallel, which are arranged to the right and to the left at an axle beam and are movably connected by the said axle beam via corresponding support points to the vehicle frame or to a part connected thereto. Wheels are fastened to the said axle parts so that the axle beam extends so-to-say between the wheels arranged at the right and at the left. Wheel drives, in particular singular wheel drives, are advantageously arranged laterally at the said axle parts and the said wheels can be driven by means of them.

The axle beam is resiliently suspended at the vehicle frame via the said spring device, which can be configured, for example, in the form of a suspension strut, such that the axle beam has an advantageously larger spring travel together with the wheels fastened thereto and so has a vertical movability upwardly and downwardly in order also to be able to compensate larger ground irregularities such as can occur, for example, with excavation vehicles in the uneven terrain to be driven on. On the other hand, axle suspensions of this type should also be able to oscillate around a lying pendular axis facing approximately in the direction of travel or the longitudinal direction of the vehicle, so that road surface irregularities such as obliquely extending elongate grooves, for example, between the wheels arranged to the right and to the left of the axle beam can be compensated in a pendular manner. In this connection, the wheel arranged at the left on the axle beam, for example, moves slightly upwardly, whereas the wheel arranged at the right on the axle beam moves slightly downwardly.

At higher driving speeds on irregular road surfaces, this free movability of the axle beam around the said lying pendular axis in addition to the upward and downward movability in the upright direction as well as the resilient properties of the pneumatic tires can result in uncontrolled rotary movements of the axle units and substantially impair the handling of the truck. To provide a remedy here, it has already been proposed to use movement damping devices which, as a rule, act in an oil-hydraulic manner and/or mechanically and are arranged directly between the wheel units and the vehicle frame. Such damping devices, however, usually induce a restriction of the spring travel of the axle beam or large spring travels of the axle beam cannot be carried out in the upward and downward direction when such movement dampers are used. The very limited space relationships in the region of the rear axle of such trucks represent an aggravating factor here.

SUMMARY OF THE INVENTION

The present invention wants to provide a remedy here. It has the underlying object of providing an improved axle suspension of the initially named kind which avoids the disadvantages of the prior art and further develops the latter in an advantageous manner. The axle suspension should preferably be improved such that uncontrolled wheel movements or axle movements and the corresponding impairments of the handling are avoided, without sacrificing the large spring travel and the movability of the axle beam around the aforesaid pendular axle required for the compensation also of more pronounced road surface irregularities.

The present invention proposes for this purpose a pendular damping device made in a special manner which permits a very large spring travel of the axle beam with a compact structure. In particular, in this connection, the damper struts directly connecting the wheel units to the vehicle frame are dispensed with in order thereby not to limit the spring travel and to prevent a space-saving arrangement of the suspension components. In accordance with the invention, the pendular damping device has a rotary axle which is pivoted to a part connected to the vehicle frame and drives a damping lever rotatably pivoted to the axle beam in a rotary manner on pendular movements, said damping lever acting on at least one damping member fastened to the axle beam. An indirectly actuated damping member is therefore in particular used instead of damping members arranged directly between the wheel units and the vehicle frame, with the pendular movement per se first being converted into a driving movement of an actuator in the form of a rotary axle which then acts on the damping member. Due to this indirect action of the damping member, the latter can in particular be seated directly at the axle beam and be arranged wholly in its region.

To permit a large spring travel, in a further development of the invention, the said rotary axle is pivoted not at a fixed vehicle frame point at the vehicle frame side, but is rather movably guided in the direction of the upward and downward movement of the axle beam. For this purpose, a guide is provided which is fastened to the vehicle frame or to a part connected thereto and in which the rotary axle or a connector rotationally fixedly connected thereto is displaceably guided. In this connection, the guide provides an approximately upright displacement path for the pivot point of the rotary axle, said displacement path advantageously being able to extend in approximately the form of a circle arc around the rotation pole about which the axle beam rotates on upward and downward movements.

The said guide could generally be rigidly fastened directly to the vehicle frame or to a part thereof. In a further development of the invention, the said guide is fastened to a part of the spring device for the support of the axle beam. If, in a further development of the invention, the said spring device comprises a suspension strut, the guide can be fastened to the suspension strut member which is supported at the vehicle frame.

Generally, the rotary axle or the connector connected thereto can be linearly displaceable in the aforesaid guide, but guided rotationally fixedly, so that so-to-say the rotary axle stands rotationally fixedly and, on pendular movements of the axle beam, only the latter rotates with respect to the rotary axle. In an advantageous further development of the invention, provision is, however, made for the rotary axle to be rotationally fixedly connected to a pendulum abutment at its end at the guide side, said pendulum abutment being displaceably and rotatably supported in the aforesaid guide. The pendulum abutment is advantageously coupled to the axle beam such that a pendular movement of the axle beam is converted into a pendular movement of the pendulum abutment which is preferably in an opposite sense. A translation of the pendular movements of the axle into corresponding rotary movements of the rotary axle can thereby be achieved which, via the rotary level piece supported at the axle beam, then actuates the at least one damping member coupled thereto. Depending on the configuration of the pendulum abutment and of the coupling of the pendulum abutment with the axle beam, a more or less pronounced amplification of the rotation of the rotary axle and so of the damping effect can be achieved.

The at least one damping member can generally be configured in different manners. In accordance with an advantageous embodiment of the invention, the damping member is configured to be longitudinally adjustable and is connected in each case pivotally to the rotatably supported damping lever, on the one hand, and to the axle beam, on the other hand. Telescopic pressure fluid dampers can, for example, be used as the damping members. The damping lever advantageously actuates at least one pair of damping members which can be arranged on oppositely disposed sides of the axle beam. To achieve a compact arrangement, the damping members are advantageously arranged at the side surfaces of the axle beam so that they nestle substantially completely at the side flanks of the axle beam, with the length of the damping members in accordance with an embodiment of the invention being able to correspond—in approximate terms—to approximately the height of the axle beam. Other configurations of the damping members are naturally possible, with an arrangement of the damping members in the manner described above to the right and left at the side at the axle beam being able to have the advantage with respect to only one damping member that the pendular damping action is homogenized in both directions. The one damping member is elongated, whereas the other damping member is shortened. If a pendular movement in the opposite direction takes place, the elongation or shortening takes place at the respective other damping member.

In a further development of the invention, in the sense of a compact arrangement of the pendular damping device, the rotary axle of the pendular damping device can be arranged inclined at an acute angle to the longitudinal axis of the axle beam, with, in an advantageous further development of the invention, the rotary axle being able to be placed approximately in a perpendicular central longitudinal plane of the axle beam.

To achieve an axle beam bearing equally movable up and down and movable around a lying pendular axis facing in the longitudinal direction of the vehicle, in a further development of the invention, the axle beam can have two support points spaced apart from one another which are preferably arranged at a front end section of the axle beam, on the one hand, and at a rear end section of the axle beam, on the other hand, so that a straight line connecting the two support points defines—in approximate terms—the direction of the pendular axis. The support points can be arranged and/or the axle beam can be configured such that a straight line connecting the support points extends approximately in the longitudinal direction of the vehicle, with certain deviations therefrom being able to be possible and even being able to be advantageous under certain circumstances.

One of the two said support points is advantageously pivotally fastened to a vehicle frame part by a spherical bearing, whereas the other support point of the axle beam is connected to the spring device which resiliently supports the axle beam. The spring device is advantageously likewise pivotally connected to the axle beam by a second spherical bearing.

In a further development of the invention, the two spherical bearings are pivotable in a multi-axial manner in the manner of a ball bearing or of a cardan joint in order to permit the desired free movability in a plurality of axes of movement for the axle beam and thus for the wheels supported thereon, in particular the upward and downward movement and the pendular movement around the lying pendular axis controlled by the spring device.

To support the damping of the pendular movements, the bearing points can, in a further development of the invention, have bearing damping members which are active at least with respect to the pendular axis and which can advantageously be integrated in the bearings. In accordance with an advantageous embodiment of the invention, the said bearing damping members can be arranged between the bearing parts of each spherical bearing which are movable relative to each other. The said bearing damping members are themselves protected, on the one hand, by the integrated arrangement of the bearing damping members. On the other hand, a compact structure can be achieved which does not bring along any larger space requirements in comparison with conventional spherical bearings.

The bearing damping members can generally be configured in different manners. In a further development of the invention, rubber squeezing members can be integrated in the bearings which are elastically deformed on the loading or movement of the bearing around the pendular axis. In particular, the bearings can be formed as cardanically movable, biased rubber metal bearings. According to a preferred embodiment of the invention, biased rubber elements can be integrated between the two bearing parts movable relative to each other and/or into a bearing part so as to give the bearing the desired cardanic movability. In particular, the preloading of the rubber elements is dimensioned such that the rubber layers and rubber elements, respectively, are never subject to tensile loads, but always to compression loads when the bearing is moved. In a preferred embodiment of the invention, a package of rubber layers preloaded to a sufficient extent can be used, wherein the movement of the bearing is allowed or effected by means of the movement of the rubber layers only.

Alternatively or additionally, spring members, preferably in the form of a spring pack, in particular in the form of a plate spring pack, can be integrated in the bearings and pivot bearings, respectively, and can effect a restoration of the spherical bearing into its starting position with respect to the pendular axis and effect a pendular damping to this extent.

The spring device of the axle suspension which controls and cushions the upward and downward movement of the axle beam is, in a further development of the invention, configured in the form of a suspension strut, with a gas compression suspension strut being able to be provided, for example, in a further development of the invention.

The suspension strut is advantageously pivotally hinged in a multi-axial manner to the axle beam in order also to permit the pendular movements of the axle beam in addition to the upward and downward movements. In a preferred embodiment of the invention, the suspension strut forms a transverse guidance strut which guides the axle beam in a non-displaceable manner transversely to the direction of travel, that is substantially in the longitudinal direction of the axle parts to which the wheels are fastened. The suspension strut therefore advantageously satisfies a dual function in a further development of the invention. On the one hand, upward and downward movements of the axle beam are cushioned. On the other hand, a lateral deflection of the axle beam transversely to the direction of travel is prevented by the suspension strut. Additional support points for the axle beam and further strut connections such as transverse controls and the like can thereby be dispensed with. The axle beam is substantially only suspended via the one support point abutted at the vehicle frame as well as via the suspension strut, in particular when the rotary axle of the pendular damping device is abutted at said suspension strut at the guide side.

In this connection, the suspension strut is advantageously pivoted by means of a third bearing to the vehicle frame pivotally around a pivot axis extending parallel to the longitudinal direction of the axle part, that is substantially lying transversely to the direction of travel, with the said third bearing advantageously being configured such that the suspension strut is fastened in a non-displaceable manner in the direction of the said pivot axle and rigidly with respect to an axis lying transversely to this pivot axle. The said third bearing can be formed by means of two preferably sleeve-like or bushing-like bearing points which are spaced from each other and disposed on the right and left sides of the suspension strut. The bearing is therefore advantageously only pivotal with respect to one axis, with it being able to prevent tilt movements around axes extending transversely thereto as well as pushing movements in the direction of the said pivot axle.

The rotary axle of the pendular damping device is advantageously connected to that part of the suspension strut which is fastened to the vehicle frame. This can in particular be the suspension strut housing into which a suspension strut bar dips. The previously described guide, at which the previously described pendulum abutment is displaceably guided, can in particular be rigidly fastened to the suspension strut housing.

At its other end, the rotary axle is pivoted at the axle beam between its two support points, preferably in a section of the axle beam which directly adjoins the axle part bearing the wheels and which can be located approximately—in approximate terms—centrally between the support points.

BRIEF DESCRIPTION OF THE DRAWINGS

The invention will be explained in more detail in the following with respect to an embodiment and to associated drawings. There are shown in the drawings.

DESCRIPTION OF THE PREFERRED EMBODIMENTS

Figure 1:
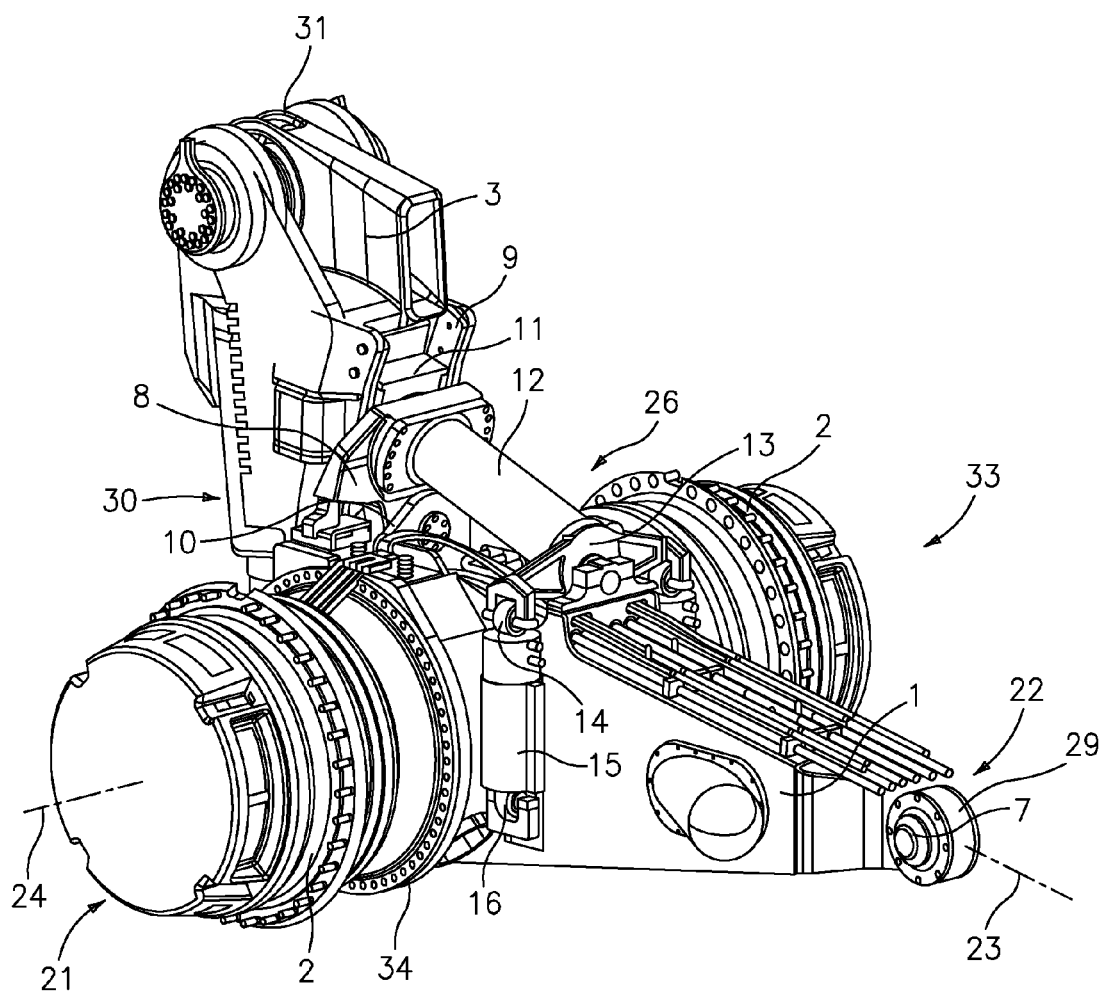
FIG. 1: a perspective view of an axle suspension in accordance with a preferred embodiment of the invention obliquely from the front which shows the axle beam with the two wheel drives fastened thereto and the pendular damping device connected to the axle beam.
Figure 2:
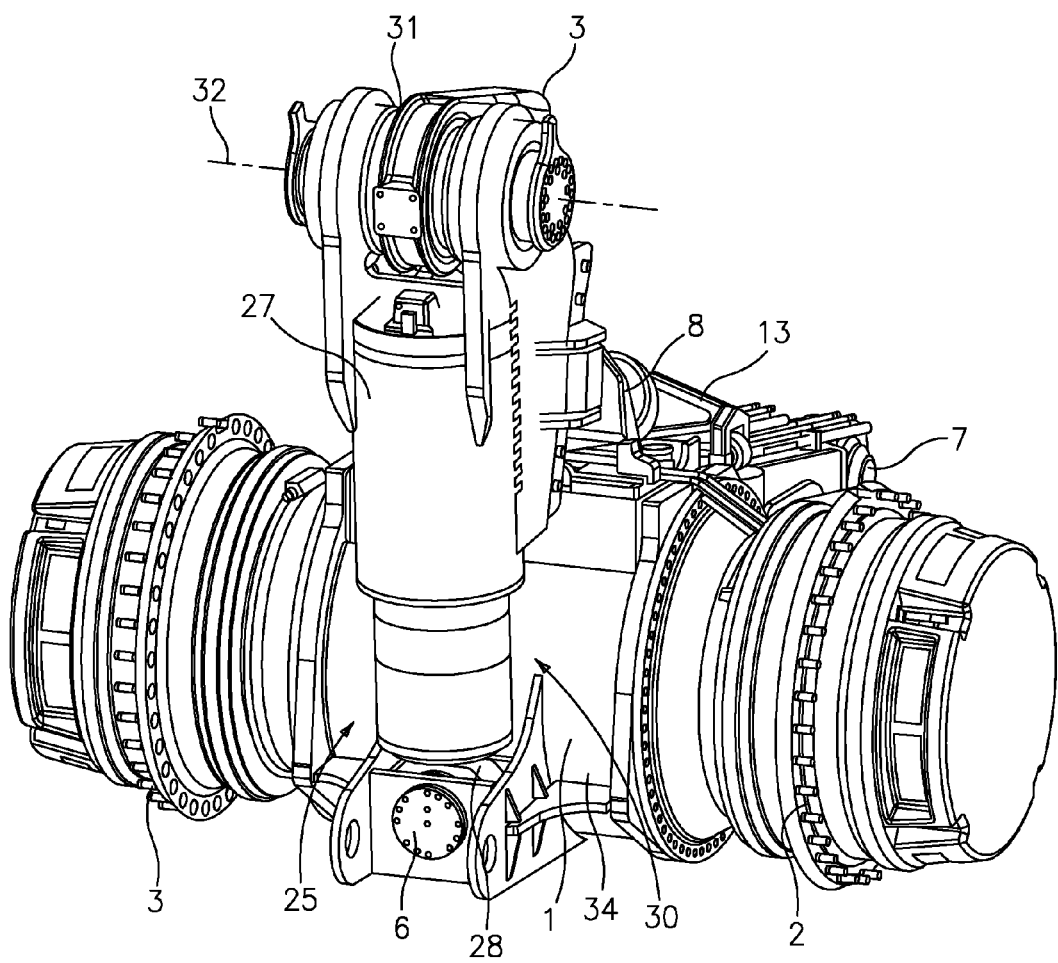
FIG. 2: the axle suspension of FIG. 1 in a perspective representation obliquely from the rear which shows the suspension spring via which the axle beam is supported resiliently at the vehicle frame.

The axle suspension 33 drawn in FIGS. 1 and 2 comprises, viewed in total and expressed in approximate terms, an elongate beam-shaped axle beam 1 which is arranged, in the drawn embodiment, substantially lying with respect to its longitudinal axis and parallel to the longitudinal axis of the vehicle. As the Figures show, the axle beam 1 is made in the manner of a housing. It in particular forms an axle housing 34 in the region of its rear end section which forms a reception for two axle parts 21 which project over at the right and left and whose axles are approximately coaxial and extend in a lying manner transverse to the direction of travel. The two axle parts 21 project over at oppositely disposed sides of the axle beam 1 and each comprise a wheel drive 2 which can be configured differently in a manner known per se, for example in the form of a hydraulic motor or of an electric motor.

Figure 3:
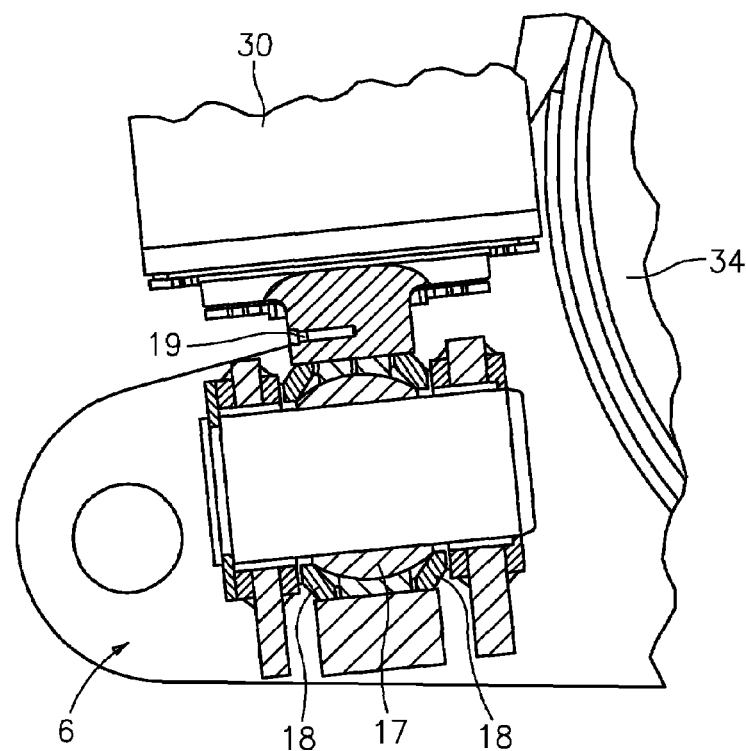
FIG. 3: a sectional view of the spherical bearing with which the suspension strut of FIG. 2 is fastened to the axle beam.
Figure 4:
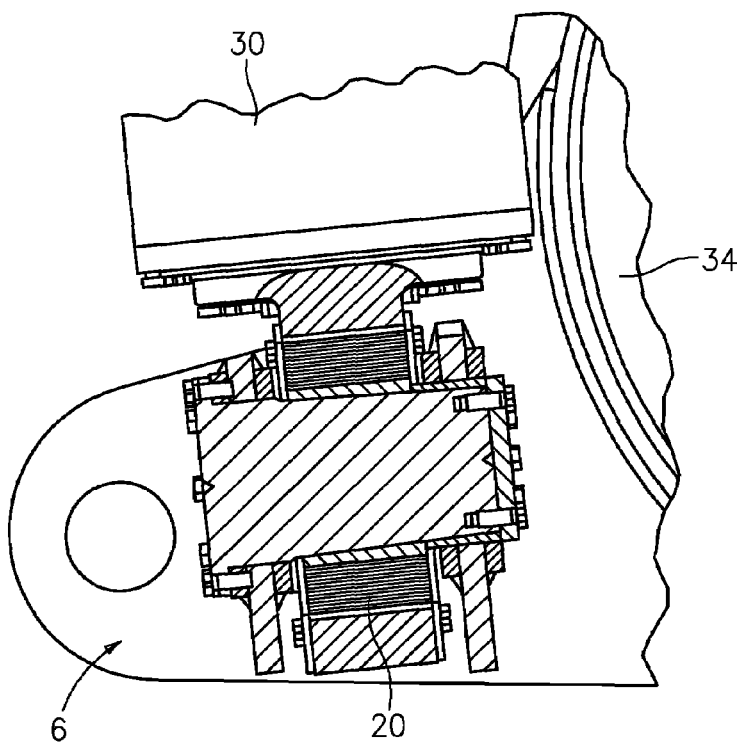
FIG. 4: a sectional view of the spherical bearing by which the suspension strut of FIG. 2 is fastened to the axle beam in accordance with an alternative embodiment of the invention.

The said axle beam 1 comprises, in the drawn embodiment, two support points which are provided at oppositely disposed ends of the axle beam 1, namely a rear support beam 6 provided at the axle housing 34 and a front support point 7 arranged at the front end of the axle beam 1, cf. FIGS. 1 and 2. Respective spherical bearings 28 and 29 or cardanically movable bearings, respectively, such as are shown in FIGS. 3 and 4 and will be explained in more detail are provided at the two support points 6 and 7. The two bearings 28 and 29 are movable in a multi-axial manner in each case in the manner of ball bearings or cardan joints, but according to an advantageous embodiment they can have a structure differing from a conventional ball joint. They in particular permit pivot movements of the axle beam 1 in each case around a lying transverse axis as well as around a likewise lying pendular axis 23 extending in the longitudinal direction of the axle beam 1.

Whereas the front support point 7 is fastened to the vehicle frame via the bearing 29, the rear support point 6 is fastened via the bearing 28 to a suspension strut 30 which is pivoted at its other end to the vehicle frame 3 via a third bearing 31. The suspension strut 30 is advantageously supported directly at the axle housing 34 at the support point which forms the rear support point in the drawn embodiment. It would generally be conceivable to swap around the two support points or the axle beam such that the axle beam 1 extends to the rear starting from the axle housing 34 such that the rear support point then forms the support point abutted at the vehicle frame and the suspension strut would be fastened to the front support point. The drawn embodiment is, however, the preferred configuration.

The third bearing 31 provided at the upper end of the suspension strut 30 is advantageously configured such that the suspension strut 30 is fastened to the vehicle frame 3 pivotally around a lying transverse axis, with the suspension strut 30 being guided non-displaceably in the direction of this lying transverse axis and also not being able to tilt with respect to pendular movements around axes perpendicular to the said lying transverse axis. The bearing 31 can be formed by the two sleeve-like bearing elements disposed on the right and left sides, cf. FIGS. 1 and 2. As FIG. 2 shows best, the suspension strut housing 27 is pivotally connected via solid flange plates to the lying transverse axle of the upper hinge point of the suspension strut such that the suspension strut 30 forms a stable transverse guide strut. Despite the multi-axial lower hinge point at the rear support point 6, the axle beam 1 is hereby guided in a stable manner via the suspension strut 30 in the transverse direction, that is in the longitudinal direction of the axle parts 21. The axle beam 21 can advantageously bounce up and down substantially in the vertical direction or in the form of a pivot movement around the front support point 7 and swing around the lying pendular axis 23. A transverse deflection thereto is, however, advantageously largely prevented.

To damp the pendular movements with respect to the pendular axis 23, a pendular damping device 26 is provided which comprises the rotary axle 12 which can be seen best in FIG. 1, which extends substantially parallel to the longitudinal central plane of the axle beam 1 on the upper side of the axle beam 1 and which is arranged slightly inclined at an acute angle with respect to the longitudinal axis of the axle beam 1. At its front end, the rotary axle 12 is rotationally fixedly connected to a damping lever 13 which is supported rotatably at the axle beam 1 around a lying axis facing in the longitudinal direction of the axle beam 1 and which extends with lever arms toward both sides, cf. FIG. 1. Damping members 15 arranged to the right and to the left of the axle beam 1 are arranged at the said damping lever 13 and are pivoted, on the one hand, in an articulated manner via spherical bearings 14 and 16 to the respective arm of the damping lever 13 and, on the other hand, to the axle beam 1. The damping members 15 advantageously extend along the side flanks of the axle beam 1 at which they substantially nestle so that a compact arrangement is achieved overall. The damping members 15 can be telescopic oil dampers known per se, but can also be configured differently. They are advantageously longitudinally changeable and effect the damping on a length changing.

As FIG. 1 shows, the damping members 15 and the damping lever 13 are arranged substantially directly in front of the axle housing 34.

At its rear end, the rotary axle 12 is rotationally fixedly connected to a pendular abutment 8 which is movably guided in the upright direction as a guide 9 configured as a slide guide so that the rotary axle 12 can balance or move along with upward and downward movements of the axle beam 1. The guide 9 is advantageously configured such that it permits—in approximate terms—an orbit of movement in the form of a circle arc around the front support point 7 to the rear end of the rotary axle 12.

The guide 9 is advantageously fastened to the suspension strut 30, more precisely to its part fastened to the vehicle frame 3, which is formed in the drawn embodiment by the suspension strut housing 27 or by the flange plates welded thereto.

The pendulum abutment 8 is rotatable. In this connection, the pendulum abutment 8 is pivotally connected to the axle beam 1, and indeed by means of a downwardly extending connector which is spaced apart from the rotary axis of the pendulum abutment 8 and is pivotally coupled to the axle beam 1 via a bearing 10, with the bearing 10 realizing at least one lying pivot axle approximately parallel to the pendular axis 23, but advantageously also being able to be configured pivotally in a multi-axial manner.

The following function results in this connection: On upward and downward movements of the axle beam 1, a corresponding support of the axle beam 1 by the suspension strut 30 takes place, with a large spring travel being able to be provided, and indeed irrespective of the pendular damping device 26 since its rotary axle 12 can likewise be moved up and down in the guide 9. On the other hand, for example, obliquely extending longitudinal grooves can be compensated by a pendular movement of the individual wheels around the said pendular axis 23. On such pendular movements, the axle beam 1 induces a rotary movement via the movable bearing 10 in the pendular abutment 8 which is in turn converted into a pivot movement of the damping lever 13 via the rotary axle 12. Said damping lever acts on the damping members 15 fastened thereto, whereby a damping of the pendular movement is achieved.

The pendular damping is supported by the configuration of the bearings in particular at the support points 6 and 7. As FIG. 3 shows, these spherical bearings 28 can include integrated bearing damping members, for example in the form of rubber squeezing elements 18, which, as such, form sealing elements for sealing the bearing section against the outside and are arranged between the moving joint parts. In the embodiment drawn in accordance with FIG. 3, the cardanically movable bearing 28 can have a spherically arched ball race 17 on which a bearing pan is movably seated in a multiaxial manner which engages around the ball race and is likewise made in ring shape. The rubber elements 18 are arranged between these two moving joint parts.

Alternatively, instead of such rubber squeezing elements, a cardanically movable, preloaded rubber metal bearing can be provided according to an advantageous embodiment of the invention, as FIG. 4 shows. A multi-axial movability of the spherical bearing is also thereby achieved, with the multi-axial movability simultaneously being damped. In particular, a plurality of rubber squeezing elements 20 and rubber layers, respectively, similar or corresponding to spring packs can be integrated into the bearing so that the desired cardanic movability can be achieved by means of a corresponding deformation of the rubber squeezing elements. Preferably, the rubber squeezing elements 20 are preloaded to such an extent that they do not become subject to tensile loads, but only to compression loads when the bearing is moved. Thus, an outstanding dampening characteristic can be achieved as well as a high stability of the rubber elements.

In this connection, FIG. 3 also shows a lubrication supply which is integrated in the spherical bearing and comprises a bore 19 which is, for example, guided up to and into the support surfaces of the joint parts via a transverse bore.

The invention claimed is:

1. An axle suspension for heavy vehicles, in particular trucks, comprising
    an axle beam (1) which bears axle parts (21) projecting over at oppositely disposed sides, each axle part preferably bearing a wheel drive (2);
    an axle beam bearing (22) which permits upward and downward movements of the axle beam (1) as well as pendular movements of the axle beam (1) around a substantially lying pendular axis (23) transverse to the longitudinal direction (24) of the axle parts (21);
    a spring device (25) for the resilient support of the upward and downward movements of the axle beam (1) at a vehicle frame (3); and
    a pendular damping device (26) for the damping of the pendular movements of the axle beam (1), wherein
    the pendular damping device (26) has a rotary axle (12) which is pivoted to a part (27) connected to the vehicle frame (3) and drives a damping lever (13) rotatably pivoted to the axle beam (1) in a rotary manner on pendular movements of the axle beam (1),
    said damping lever acting on at least one damping element (15) fastened to the axle beam (1).

2. An axle suspension in accordance with claim 1, wherein the rotary axle (12) is pivoted to a spring device part (27) connectable to the vehicle frame (3) at the vehicle frame side.

3. An axle suspension in accordance with claim 1, wherein the rotary axle (12) is movably guided at the vehicle frame side via a guide (9) substantially in the direction of the upward and downward movement of the axle beam (1).

4. An axle suspension in accordance with claim 1, wherein the rotary axle (12) is rotationally fixedly connected at its end at the guide side to a pendulum abutment (8) which is displaceably guided in the guide (9) and is rotatably guided in the longitudinal direction of the rotary axle (12) and is coupled to the axle beam (1) such that a pendular movement of the axle beam (1) can be converted into a pendular movement of the pendulum abutment (8).

5. An axle suspension in accordance with claim 1, wherein the pendulum abutment (8) is connected to the axle beam (1) by a pendulum abutment spherical bearing (10) which has a joint axis preferably parallel to the longitudinal direction of the rotary axle (12) and which is spaced apart from the rotary axle (12).

6. An axle suspension in accordance with claim 1, wherein the at least one damping member (15) is configured longitudinally changeable and is in each case preferably pivotally connected to the damping lever (13) at the one end and to the axle beam (1) at the other end.

7. An axle suspension in accordance with claim 1, wherein the rotary axle (12) extends inclined at an acute angle with respect to the longitudinal axis of the axle beam (1), preferably approximately in a perpendicular central longitudinal plane of the axle beam (1).

8. An axle suspension in accordance with claim 1, wherein the axle beam (1) has two support points (6, 7) which are spaced apart from one another, are preferably arranged at front and rear end sections of the axle beam (1) and of which the one support point (7) is pivotally fastened to a vehicle frame part by a first bearing (28) and the other support point (6) is fastened to the spring device (25).

9. An axle suspension in accordance with claim 8, wherein the spring device (25) is fastened to the axle beam (1) by a second bearing (29).

10. An axle suspension in accordance with claim 9, wherein the first and/or the second spherical bearing (28, 29) is cardanically movable and/or configured pivotally in a multi-axial manner in the manner of a ball bearing of or a cardan joint.

11. An axle suspension in accordance with claim 8, wherein the first and/or the second bearing (28, 29) has at least one bearing damping member (18, 20) active with respect to at least one movement axis.

12. An axle suspension in accordance claim 11, wherein the at least one bearing damping member (18, 20) is integrated in the spherical bearing (28, 29).

13. An axle suspension in accordance with claim 11, wherein the at least one bearing damping member (18, 20) is a rubber squeezing element.

14. An axle suspension in accordance with claim 12, wherein the first and/or the second bearing (28, 29) is configured as a preloaded rubber metal bearing comprising at least one preloaded rubber squeezing element (20), preferably a plurality of rubber squeezing elements one above the other, by means of which the bearing (28, 29) is movable cardanically.

15. An axle suspension according to claim 14, wherein the preload of the at least one rubber squeezing element is dimensioned such that the at least one rubber squeezing element is subject exclusively to compression loads when the bearing moves.

16. An axle suspension in accordance with claim 1, wherein the spring device (25) is configured as a suspension strut (30), preferably as a gas compression suspension strut.

17. An axle suspension in accordance with claim 16, wherein the suspension strut (30) is pivotally hinged in a multi-axial manner to the axle beam (1) and forms a transverse guide strut which guides the axle beam (1) in a non-displaceable manner in the longitudinal direction (24) of the axle parts (21).

18. An axle suspension in accordance with claim 17, wherein the suspension strut (30) is pivoted by means of a third bearing (31) to the vehicle frame (3) pivotally around a suspension strut pivot axis (32) parallel to the longitudinal direction (24) of the axle parts (21), with the third bearing (31) being configured such that the suspension strut (30) is fastened in a non-displaceable manner in the direction of said suspension strut pivot axle (32) and rigidly with respect to an axis lying transversely to said suspension strut pivot axle (32).

19. An axle suspension in accordance with claim 17, wherein the rotary axle (12) of the pendular damping device (26) is connected to a suspension strut part (27) fastened to the vehicle frame (3).

20. An axle suspension in accordance with claim 19, wherein the guide (9) is fastened to said suspension strut part (27) for the displaceable guidance of the rotary axle (12) in the direction of the upward and downward movements of the axle beam (1).

21. An axle suspension in accordance with claim 1, wherein the rotary axle (12) of the pendular damping device (26) is pivoted to the axle beam (1) between the two support points (6, 7) of the axle beam (1), preferably in a center section of the axle beam (1) adjoining the axle parts (21).

22. An axle suspension in accordance with claim 8, wherein the axle beam (1) is connected to the vehicle frame (3) solely by one of the two support points (6, 7) and the pivot point of the spring device (25) free of transverse connectors and the like.

23. A heavy vehicle, in particular a truck, comprising an axle suspension in accordance with claim 1.

* * * * *